United States Patent [19]

Nilssen

[11] Patent Number: 4,998,044

[45] Date of Patent: Mar. 5, 1991

[54] EFFICACY INCANDESCENT LIGHT BULBS

[76] Inventor: Ole K. Nilssen, Ceasar Drive, Rte. 5, Barrington, Ill. 60010

[21] Appl. No.: 814,053

[22] Filed: Dec. 27, 1985

[51] Int. Cl.$^5$ ............................................. H01J 29/00
[52] U.S. Cl. .................................. 315/200 C; 315/70; 315/209 T
[58] Field of Search ................... 315/209 T, 212, 224, 315/309, DIG. 7, 70, 209 R, DIG. 4; 313/315, 317, 318, 323, 324; 339/75 T, 91 L

[56] References Cited

U.S. PATENT DOCUMENTS

| | | | |
|---|---|---|---|
| 2,587,169 | 2/1952 | Kivari | 315/70 |
| 3,355,612 | 11/1967 | Peek, Jr. | 313/317 |
| 3,525,012 | 8/1970 | Dimitracopoulos et al. | 315/70 |
| 4,112,336 | 9/1978 | Rios | 315/71 |
| 4,207,497 | 6/1980 | Capewell et al. | 315/96 |
| 4,422,015 | 12/1983 | Nilssen | 315/209 R |
| 4,443,778 | 4/1984 | Mewissen | 315/57 |
| 4,464,607 | 8/1984 | Peil et al. | 315/DIG. 7 |
| 4,500,813 | 2/1985 | Weedall | 315/276 |
| 4,525,651 | 6/1985 | Ahlgren | 315/DIG. 4 |
| 4,591,764 | 5/1986 | Nilssen | 315/172 |

FOREIGN PATENT DOCUMENTS 2158419 11/1971 Fed. Rep. of Germany ... 315/209 R
2415087 10/1975 Fed. Rep. of Germany .

*Primary Examiner*—James J. Groody
*Assistant Examiner*—M. Powell

[57] ABSTRACT

An improved 120 Volt/40 Watt incandescent light bulb is adapted to be used in an ordinary Edison-type lamp socket and provides nearly twice the effective Lumen-output as that of an ordinary 120 Volt light bulb of same power rating and same life expectancy.

The improved light bulb comprises an electronic inverter-type voltage conditioner that provides a voltage of about 15 Volt RMS magnitude to the filament of a small Tungsten-Halogen lamp. This voltage conditioner is comprised within the bottom part of the light bulb and the Tungsten-Halogen lamp is mounted right above the power conditioner—all within an outer envelope.

The improved light bulb has shape and size substantially the same as that of an ordinary household 120 Volt/40 Watt light bulb.

Means are provided by which the Lumen output can be manually adjusted over a wide range.

In one version, the outer envelope is removable and the small Tungsten-Halogen lamp is replaceable.

20 Claims, 2 Drawing Sheets

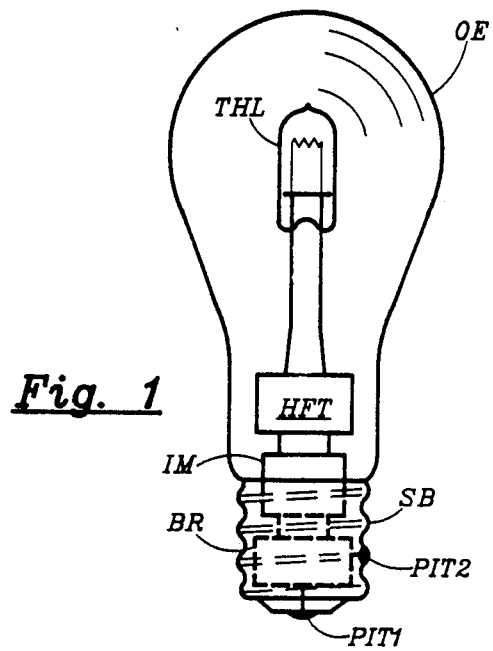
Fig. 1
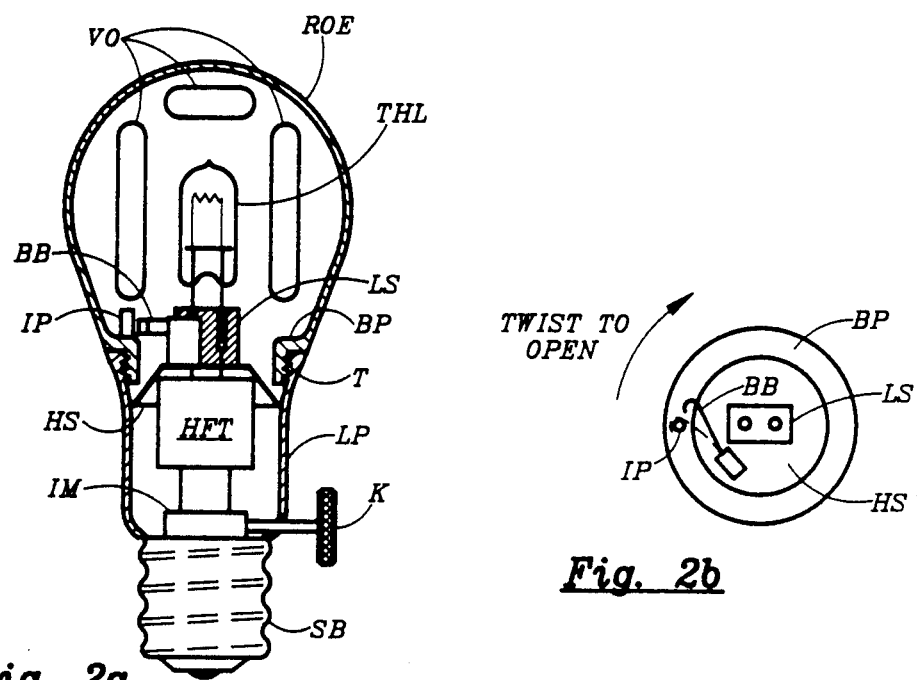
Fig. 2a
Fig. 2b
Fig. 2

*Fig. 3b*     TIME ⟶

EFFICACY INCANDESCENT LIGHT BULBS

BACKGROUND OF THE INVENTION

1. Field of Invention

The present invention relates to incandescent light bulbs, particularly of a type having improved luminous efficacy.

2. Prior Art

Previous efforts at attaining significantly improved luminous efficacy in ordinary incandescent light bulbs—i.e., light bulbs of a type useful as direct replacements for present 120 Volt household light bulbs—have been directed toward the use of a reflector means operative to reflect much of the infrared radiation back onto the incandescent filament while letting visible radiation pass through with little attenuation.

Examples of approaches of this nature are provided by numerous prior art references, such as the following U.S. Pat. Nos.: No. 1,342,894 to Bugbee; No. 1,425,967 to Hoffman; No. 2,859,369 to Williams et al.; No. 4,039,878 to Eijkelenboom et al.; No. 4,160,929 to Thorington et al.; No. 4,283,653 to Brett; No. 4,366,407 to Walsh; and No. 4,375,605 to Fontana et al.

However, even though the basic principle has been known for decades, and even though the attainable efficacy improvement is on the order of several hundred percent, household light bulbs based on this principle of selective reflection of infrared energy is not yet available on the market. The reason for this is apparently connected with the difficulty in translating the basic principle into high-volume production of corresponding cost-effective household light bulbs.

SUMMARY OF THE INVENTION

Objects of the Invention

An object of the present invention is that of providing a basis for designing and manufacturing cost-effective incandescent household light bulbs of much improved luminous efficacy.

Another object is that of providing an incandescent light bulb that is suitable as a direct substitution for a presently ordinary household light bulb and that has much improved durability and/or luminous efficacy.

These as well as several other important objects and advantages of the present invention will become apparent from the following description.

Brief Description

An improved 120 Volt/40 Watt incandescent light bulb is adapted to be used in an ordinary Edison-type lamp socket and provides about twice the effective Lumen-output as that of an ordinary 120 Volt light bulb of same power rating and same life expectancy.

The improved light bulb comprises an electronic inverter-type voltage conditioner that provides a voltage of about 15 Volt RMS magnitude to the filament of a small Tungsten-Halogen lamp. This voltage conditioner is comprised within the bottom part of the light bulb and the Tungsten-Halogen lamp is mounted right above the power conditioner—all within an outer envelope.

The improved light bulb has shape and size substantially the same as that of an ordinary household 120 Volt/40 Watt light bulb.

Means are provided by which the Lumen-output can be manually adjusted over a wide range.

In one version, the outer envelope is removable and the small Tungsten-Halogen lamp is replaceable.

BRIEF DESCRIPTION OF THE DRAWINGS

FIG. 1 represents an illustration of a first preferred embodiment of the invention.

FIG. 2 represents an illustration of a second preferred embodiment of the invention.

PROBLEM SITUATION UNDERLYING INVENTION

Figure 3A:
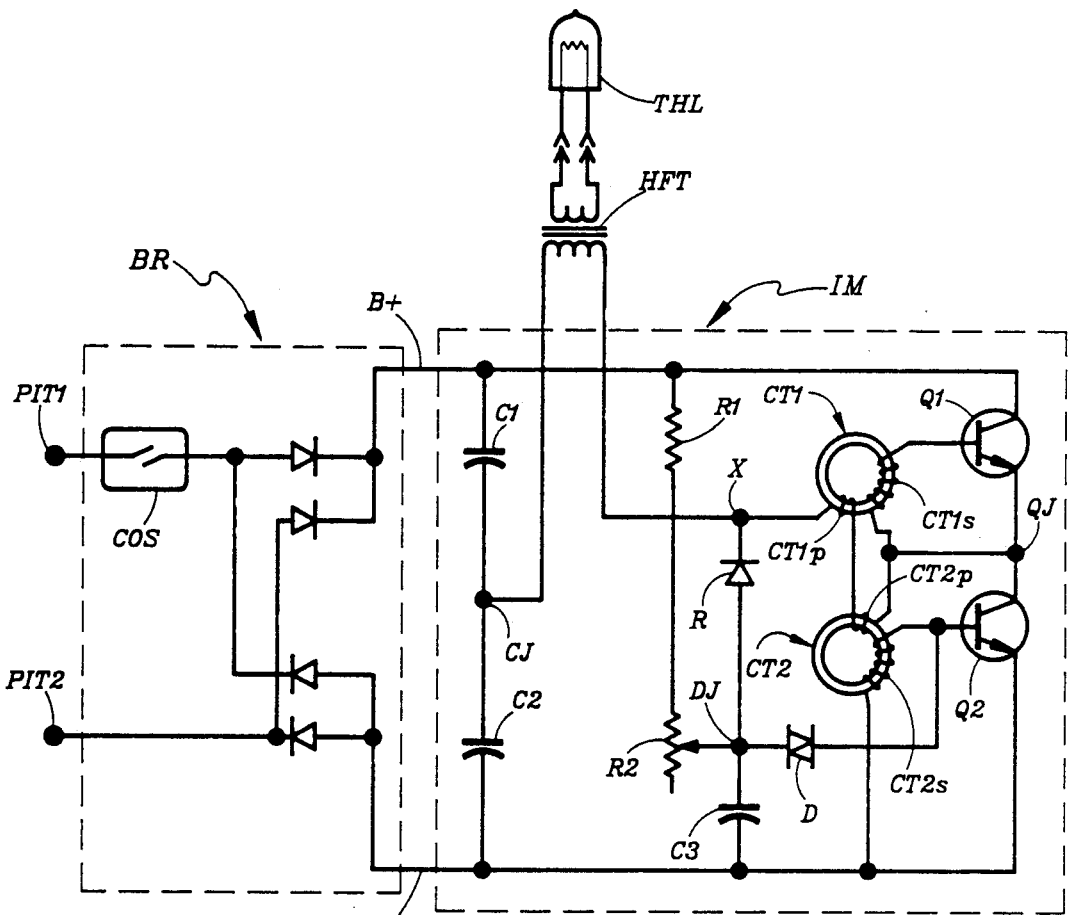
FIG. 3 provides a schematic circuit diagram of the preferred embodiments of the invention.

It is well known that ordinary household incandescent light bulbs have relatively poor luminous efficacies, especially as compared with various types of gas discharge lamps. Various attempts are being made in respect to improving this efficacy.

Two of these attempts relate to the use of compact forms of self-ballasted gas discharge lamps: one by North American Philips Corporation based on using a double-folded fluorescent lamp, and another by General Electric Company based on using a Metal-Halide lamp. However, these two approaches—being of the gas discharge type—comprise several severe limitations; which probably explains why these lamps have as yet not come into widespread use.

An altogether different attempt is being pursued by Duro-Test Corporation of North Bergen, N.J.; which attempt involves the application of the principle of reflecting infrared readiation back onto the incandescent filament in an incandescent lamp, while permitting visible radiation to escape relatively unimpeded. However, although having been pursued for a number of years, this approach has so far produced no corresponding generally available high-efficacy household light bulbs.

It is also well known that relatively modest efficacy improvements in household light bulbs may be attained by various means. For instance, by using Krypton gas within the glass envelope of the light bulb, an efficacy improvement on the order of 5–10% may be achieved. Or, alternatively, a Tungsten-Halogen cycle may be used with a resulting efficacy improvement on the order of 10–20%.

In this connection, it is noted that some of the improvement techniques may effectively be used in combination with each other, thereby to attain their combined advantages; while others—such as the simultaneous use of Krypton and the Tungsten-Halogen cycle—are basically non-compatible and can not effectively be used in combination.

However, there is one significant approach to achieving improved luminous efficacy in household incandescent light bulbs which has not been pursued, probably at least in part for the reason that it is not well known. This approach as based on the observation that the luminous efficacy of higher wattage light bulbs are significantly better than those of lower wattage light bulbs. For instance, in respect to ordinary household-type incandescent light bulbs: a 120 Volt/15 Watt/2500 Hour light bulb produces about 8.3 Lumens/Watt; a 120 Volt/25 Watt/2500 Hour light bulb produces 9.4 Lumens/Watt; a 120 Volt/40 Watt/2500 Hour light bulb produces 10.5 Lumens/Watt; a 120 Volt/100 Watt/2500 Hour light bulb produces 14.4 Lumens/Watt; a 120 Volt/150 Watt/2500 Hour light bulb produces 15.4 Lumens/Watt; a 120 Volt/200 Watt/2500

Hour light bulb produces 16.3 Lumens/Watt; a 120 Volt/300 Watt/2500 Hour light bulb produces 17.3 Lumens/Watt; etc. (All of these data were obtained from a Lamp Catalog from General Electric Company.)

Thus, at the same lamp life, the luminous efficacy of the 300 Watt light bulb is about 84% better than that of the 25 Watt light bulb.

The reason why the efficacy of the 300 Watt light bulb is so much higher than that of the 25 Watt light bulb has to do with the nature of the filament and the lamp fill gas: the filament of the 300 Watt bulb is sturdier and it loses relatively less heat to the surrounding gas, and can—for a given life expectancy—operate at a higher color temperature.

Since, a 300 Watt filament can roughly be considered as constituting twelve series-connected short segments, each operating at 25 Watt, it can be understood that a 25 Watt incandescent light bulb of 84% improved efficacy can be made by using but one of the twelve 25 Watt segments of a 300 Watt filament. Of course, due to end-effects, the comparison is not totally correct; but the basic rationale is fundamentally sound.

However, in order to operate at 25 Watt and to exhibit the 84% improved efficacy, one of the twelve segments of the 300 Watt filament would have to be powered by a 10 Volt source. That is, such a filament could not be powered directly from an ordinary 120 Volt lamp socket.

The present invention is to a significant degree based on the recognition that improved efficacy 120 Volt incandescent light bulbs may be attained by using shorter and heavier filaments, although to properly power such filaments from an ordinary 120 Volt lamp socket would require that a very compact voltage-magnitude transformation means be built right into the light bulb.

DESCRIPTION OF THE PREFERRED EMBODIMENTS

Details of Construction

FIG. 1 shows an improved efficacy incandescent light bulb adapted for use in an ordinary 120 Volt Edison-type lamp socket.

In FIG. 1, a substantially ordinary screw-base SB has a first power input terminal PIT1 and a second power input terminal PIT2. The input terminals of a bridge rectifier BR are connected with power input terminals PIT1 and PIT2, and the unfiltered DC output from this rectifier—whose RMS magnitude would be 120 Volt—is applied to the power input terminals of an inverter means IM. The 30 kHz output from inverter means IM is applied to the primary winding of a high frequency transformer HFT, the secondary winding of which provides a 15 Volt/30 kHz output voltage to the filament of a more-or-less ordinary 15 Volt/40 Watt Tungsten-Halogen lamp THL. An outer envelope OE covers that part of the total assembly that protrudes above screw-base SB.

FIG. 2a shows substantially the same arrangement as that of FIG. 1 except for: (i) having a removable outer envelope ROE, which outer envelope has ventilation openings VO and is adapted to screw into threads T in the lower portion LP of the lamp assembly; (ii) a knob K protruding from this lower portion and operative to permit adjustment of the RMS magnitude of the voltage provided to the filament of lamp THL; (iii) a heat shield HS placed between the THL lamp and transformer HFT; (iv) a lamp socket LS that permits lamp THL to be removed and replaced; (v) an interference pin IP mounted on the inner periphery of the base part BP of the removable outer envelope; and (vi) a bimetallic bender BB mounted on the heat shield.

FIG. 2b represents a view from the top part of the inside of the removable outer envelope, with lamp THL removed. The bimetallic bender is shown solidly in the position it assumes when it is relatively cold. It is shown faintly in the position it assumes when it is relatively hot.

Figure 3:
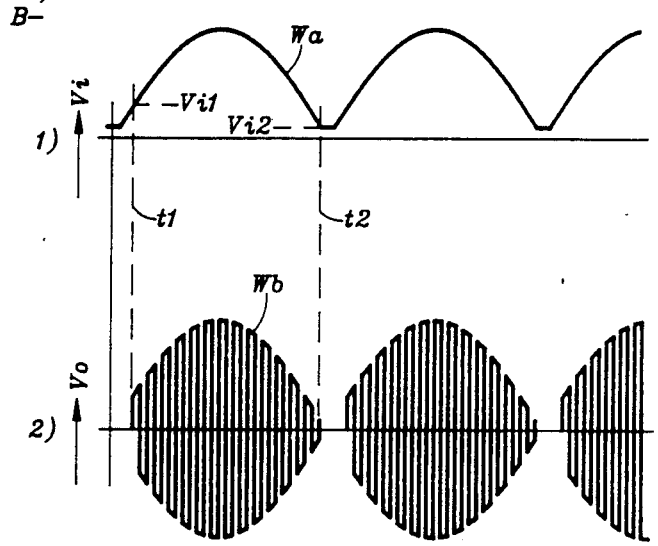

FIG. 3 shows the electrical circuit diagram of the embodiment of FIG. 2, as well as some waveforms associated therewith.

In FIG. 3a, power input terminals PIT1 and PIT 2 correspond to those on screw-base SB of FIG. 2. These power input terminals are connected with the: input terminals of a full-wave bridge rectifier arrangement BR, which includes a thermally-activated automatically-resettable cut-out switch COS; which rectifier arrangement corresponds to bridge rectifier BR of FIG. 2. The unfiltered DC output voltage from BR is applied to an inverter means IM (which corresponds to inverter means IM of FIG. 2) by way of a B+ bus and a B− bus—with the B+ bus being connected with the positive output terminal of BR.

Inverter means IM comprises a pair of capacitors C1 and C2; which capacitors are series-connected between the B+ bus and the B− bus. The junction between these two capacitors is referred to as junction CJ.

A pair of transistors Q1 and Q2 are also series-connected between the B+ bus end the B− bus, with the collector of Q1 being connected with the B+ bus and the emitter of Q2 being connected with the B− bus. The collector of Q2 is connected with the emitter of Q1 at a junction QJ.

A first saturable current transformer CT1 has a primary winding CT1p and a secondary winding CT1s; and a second saturable current transformer CT2 has a primary winding CT2p and a secondary winding CT2s.

Secondary winding CT1s of current transformer CT1 is connected directly between the base and the emitter of transistor Q1; and secondary winding CT2s of current transformer CT2 is connected directly between the base and the emitter of transistor Q2.

Primary windings CT1p and CT2p are series-connected directly between junction QJ and a point X.

A high frequency transformer HFT, which corresponds to transformer HFT of FIG. 2, is connected with its primary winding between junction CJ and point X. The secondary winding of this transformer is connected with the filament of Tungsten-Halogen lamp THL, which corresponds to lamp THL of FIG. 2.

A resistor R1 is connected with its one terminal to the B+ bus and with its other terminal to one terminal of an adjustable resistor R2. The other terminal of R2 is connected to a junction DJ, to which junction is also connected one of the terminals of a capacitor C3. The other terminal of C3 is connected to the B− bus.

A Diac D is connected between junction DJ and the base of transistor Q2; and a rectifier R is connected with its anode to junction DJ and with its cathode to point X.

FIG. 3b illustrates key waveforms associated with the circuit arrangement of FIG. 3a.

In FIG. 3b1, the waveform identified as Wa represents the voltage Vi present between the B− bus and the B+ bus as plotted against time t. The magnitude of voltage Vi at a time t1 when the inverter is triggered into oscillation is indicated as Vi1. The magnitude of voltage Vi at a time t2 the inverter drops out of oscillation is indicated as Vi2.

In FIG. 3b2, the waveform identified as Wb represents the inverter output voltage Vo plotted against time t; which output voltage exists across the secondary winding of transformer HFT in FIG. 1, and which is the voltage provided to the filament of Tungsten-Halogen lamp THL.

Description of Operation

The operation of the preferred embodiments of FIG. 1 and FIG. 2a are very simply this: they are both intended to be screwed directly into any ordinary Edison-type lamp socket and to be properly powered by the standard power line voltage provided therefrom.

In case of the arrangement of FIG. 2a, the light output from lamp THL can be adjusted over a wide range by rotating knob K; and the outer envelope ROE can be removed such as to provide access to lamp THL, thereby to permit its removal/replacement.

As indicated in FIG. 2b, however, to prevent a person from being burned by accidentally touching the THL lamp while it is still hot, bimetallic bender BB, in cooperation with interference pin IP, prevents the outer envelope from being unscrewed until the temperature within the outer envelope (just above the heat shield) has dropped to a safe level.

The operation of the inverter means of FIG. 3 is described as follows.

In FIG. 3a, ordinary 120 Volt/60 Hz power line voltage is applied between power input terminals PIT1 and PIT2; which voltage is rectified in full-wave manner by bridge rectifier BR. Thus, in the absence of filtering means, the voltage provided at the output of bridge rectifier BR will be substantially as depicted in FIG. 3b1; which voltage is applied directly between the B+ bus and the B− bus of inverter means IM.

This inverter means, which consists of the two series-connected switching transistors Q1 and Q2 in combination with the two positive feedback transformers CT1 and CT2, represents a self-oscillating half-bridge inverter and operates in a manner that is analogous with circuits previously described in published literature, as for instance in U.S. Pat. No. 4,184,128 to Nilssen.

Since the DC voltage-supply feeding the inverter has no filtering capacitors, it is necessary to provide within the inverter a low impedance return path for the inverter current. Such a low impedance return path is provided by way of the two series-connected capacitors C1 and C2. However, it is necessary that the capacitance values of these capacitors be kept small enough not to represent significant energy-storing capacity in comparison to the amount of energy being drawn by the inverter over a half-cycle of the power line voltage. In this case, with the power drawn being about 40 Watt (which is about 333 milli-Joule per half-cycle of the 60 Hz power line voltage) the energy stored by the two series-connected 0.47 uF capacitors is indeed small in comparison (being only 2.6 milli-Joule at 150 Volt).

In the inverter circuit of FIG. 3a, the bases of the transistors are—in terms of DC—shorted to their emitters; which implies that the inverter can not start oscillating by itself. However, by providing but a single brief pulse to the base of transistor Q2, this transistor is caused to conduct momentarily; which momentary conduction puts this one transistor into an amplifying situation; which is enough to trigger the inverter into oscillation—provided, of course, that there is adequate voltage present between the B− bus and the B+ bus.

Once triggered into oscillation, the inverter will continue to oscillate until the voltage between the B− bus and the B+ bus falls to such a low level as to be inadequate for sustaining regenerative feedback. At this point, which is identified as Vi2 in FIG. 2a, oscillations cease.

Inverter triggering is accomplished by way of a Diac; which Diac itself is triggered by the voltage on capacitor C3.

The output of the half-bridge inverter circuit is a substantially squarewave 30 kHz AC voltage, which output is provided between point X and junction CJ, and across which output is connected the primary winding of transformer HFT. The peak-to-peak amplitude of this squarewave voltage is equal to the magnitude of the DC voltage present between the B− bus and the B+ bus; and therefore, as the magnitude of this DC voltage varies, so does the amplitude of the squarewave output voltage.

The THL lamp is connected directly across the secondary winding of transformer HFT; which means that the voltage presented to the incandescent lamp is directly proportional to the inverter circuit output voltage.

Being supplied with a pulsed DC voltage, as indicated in FIG. 3a1, the inverter circuit—even if oscillating at some given moment—will cease oscillating when the DC supply voltage falls below a certain minimal level (Vi2 in FIG. 3a1). Thus, if the inverter is triggered into oscillation at some time during each of the unidirectional sinusoidally-shaped voltage pulses constituting the DC supply voltage, it will cease to oscillate at or near the end of each of these pulses.

Thus, the inverter circuit of FIG. 3a behaves much like a Triac: it can be triggered ON, and will remain ON until the end of the power-cycle: until current flowing to the load falls below a certain minimal level. And, like a Triac, it can be triggered at substantially any point within the power-cycle; which means that it can be phase-controlled just like a Triac.

In other words, the RMS power provided to the incandescent lamp can be controlled over a wide range simply by controlling the timing of the inverter trigger point (t1 in FIG. 3b1).

Triggering of the inverter circuit is accomplished essentially the same way as is triggering of a Triac, and phase control is accomplished in the same manner.

In FIG. 3a, resistor R1 and R2 in combination constitutes a resistance means through which capacitor C3 is charged. By adjusting the magnitude of the combined resistance, the time to charge capacitor C3 is similarly adjusted; which implies that the phase-point at which the inverter is triggered into oscillation is correspondingly adjusted.

Of course, adjusting knob K of the arrangement of FIG. 2a corresponds to adjusting the magnitude of resistor R2 of the circuit of FIG. 3a.

The purpose of rectifier R is that of making sure that capacitor C3 gets fully discharged after the inverter is triggered into oscillation; which implies that this capacitor will start each new power cycle in a fully discharged condition, thereby assuring time-consistent triggering.

Additional Comments (a) To change the THL lamp in the arrangement of FIG. 2a, the preferred procedure is that of: (i) removing the complete light bulb assembly from its socket; (ii) removing outer envelope ROE, which can be done only after the temperature of the assembly has fallen below a predetermined level; (iii) pulling out the now-accessible old THL lamp; and (iv) plugging in a new THL lamp.

(b) It is emphasized that the inverter circuit of FIG. 3a does not comprise any electrolytic capacitors. This is important, in that such capacitors would not have adequate durability at the relatively high temperatures that the inverter circuit components will be exposed to.

Of course, the purpose of the heat shield of FIG. 2a is that of reducing the temperature build-up within the inverter means; but even with the heat shield, this temperature is apt to become quite high and unsuitable for electrolytic capacitors.

(c) In fact, under extreme circumstances, the temperatures within the inverter means may become so high as to be unsuitable even for film-type capacitors; which is the type of capacitors used for the C1/C2 capacitors in the half-bridge inverter (see FIG. 3a). For applications under such circumstances, it is anticipated that a full-bridge inverter be used in place of the half-bridge inverter; in which case the C1/C2 capacitors would not be required.

(d) In some situations, for maximum efficiency and minimum cost, it is anticipated that an auto-transformer be used instead of the isolating transformer actually shown in FIG. 3a. The use of an auto-transformer would be particularly applicable to the arrangement of FIG. 1, where no electric shock hazard could be associated with exhanging the THL lamp.

(e) By allowing adjustable resistor R2 to become an open circuit at its extreme maximum position power to the THL lamp may be entirely shut off by knob K. However, just before becoming an open circuit, the maximum value attained by R2 should be such as to cause triggering to occur near the very end of each of the DC voltage pulses of FIG. 3b2.

(f) It is anticipated that the metal screw-base of the light bulb assembly of FIG. 1 (or FIG. 2a) be used as heat sink for the rectifiers and/or the transistors of the inverter means.

(g) It has been implicitly indicated herein that the optimum voltage-magnitude for which to design the filament of the THL lamp may be about 15 Volt RMS. However, it is emphasized that the actual optimum design voltage depends on power level and construction details of the lamp. Although, 15 Volt RMS may be approximately an optimum voltage-magnitude, it is believed that any RMS voltage-magnitude between 12 Volt and 24 Volt be near optimally effective.

(h) It is anticipated that in certain situations it might be advantageous to separate the voltage-magnitude-transformation function from the light bulb assembly itself, and place it instead in the base holding the lamp socket, or on a power cord or power plug used for providing power to this lamp socket.

(i) Due to the compact size of the filament of the THL lamp, it becomes readily possible to provide optically effective reflectors and/or lenses, thereby to permit the light from the THL lamp to be much more selectively directed and utilized than otherwise would be the case.

(j) As seen in FIG. 2a, the removable outer envelope has openings operative to permit ventilation, thereby keeping temperatures near the THL lamp substantially lower that otherwise would have been the case. The throw-away light bulb arrangement of FIG. 1 may also benefit from having ventilation slots in its outer envelope.

(k) The thermally-responsive cut-out switch (COS) of FIG. 3a is operative to remove power altogether from the inverter means in case the temperature therewithin were to exceed a first predetermined level. However, after the temperature falls below a second predetermined level, the cut-out switch will automatically re-close.

It is anticipated that the cut-out switch will only actuate in extreme situations, especially associated with using the light bulb structure with the base up.

(1) It is emphasized that it is definitely not feasible to use an ordinary 60 Hz transformer as the requisite voltage conversion means built into the light bulbs of FIGS. 1 and 2. To provide for the power levels required to attain light output levels useful in most normal household applications—which light output levels fall in the range from about 200 Lumens to about 2000 Lumens—a 60 Hz transformer would be so large as to make it totally non-feasible as a component built into a light bulb of anything near normal size for its light output.

(m) For many applications of incandescent light bulbs, it is important that the light bulbs draw current from the power line with a relatively high power factor; which generally means that the power factor be at least 85%.

In this connection, it is noted that the power factor associated with most ordinary frequency converter means—wherein the rectified power line voltage is filtered by filter capacitors before being applied to an inverter—is relatively poor, typically on the order of 50%.

The power factor associated with the voltage conversion means of FIG. 3a is above 85%.

(n) Another important reason not to use filter capacitors in connection with a voltage conversion means that is required to be built into a light bulb of more-or-less ordinary shape and size, relates to their physical dimensions: such filter capacitors require more space than would be available within such a light bulb.

(o) It is noted that ordinary household incandescent light bulbs come in various physical shapes and sizes. However, there is one particular shape/size that represents by far most of the incandescent light bulbs used in American households; and that is the shape/size identified as the A-19 bulb—where the letter A defines the familiar pear shape, and where the numeral 19 represents the bulb's diameter in eighths of inches.

Thus, the A-19 bulb is shaped as the bulb indicated in FIG. 1 and has a maximum bulb diameter of about 2.375".

(p) It is additionally noted that efficacy and durability are to a high degree interchangeable with one another in an incandescent light bulb. By accepting a decreased efficacy, a longer lamp life can be achieved. For instance, by accepting a reduction of about 10% in luminous efficacy, a doubling of lamp life will result.

(q) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An incandescent light bulb adapted: (i) to be used in an ordinary Edison-type lamp socket, (ii) to provide light output in the range between 200 and 2000 Lumens, and (iii) to be powered from the 120 Volt power line voltage normally provided at an ordinary Edison-type lamp socket; the light bulb comprising:
  a screw-base: (i) having a pair of base terminals, and (ii) being operative to screw into an ordinary Edison-type lamp socket and, by way of the base terminals, to receive the 120 Volt power line voltage provided thereat;
  voltage conversion means connected with the base terminals and operative to convert the 120 Volt power line voltage thereat to an output voltage provided at a pair of output terminals, the RMS magnitude of this output voltage being prevented from exceeding a level that is substantially lower than the RMS magnitude of the power line voltage;
  incandescent lamp means connected with the output terminals and operative to be properly powered by the output voltage provided therefrom; and
  translucent envelope means fastened onto the screw-base and operative to enclose the voltage conversion means and the incandescent lamp means, the envelope means when combined with the screw-base being of size and shape substantially the same as that of an ordinary household incandescent light bulb;
  whereby: (i) the incandescent lamp means is fully and powered by a voltage of RMS magnitude substantially lower than that of the voltage provided at the base terminals, (ii) the light bulb is operative to provide light output in the range between 200 and 2000 Lumens, yet being of size and shape similar to that of an ordinary household incandescent light bulb of substantially the same Lumen output rating.

2. The light bulb of claim 1 wherein the incandescent lamp means is a Tungsten-Halogen lamp.

3. The light bulb of claim 1 wherein the voltage conversion means comprises frequency conversion means operative to convert the frequency of the 120 Volt power line voltage to an AC voltage of frequency on the order of 30 kHz.

4. The light bulb of claim 1 combined with temperature-sensitive cut-out means operative to disconnect the voltage conversion means from the base terminals in case the temperature of the voltage conversion means exceeeds a predetermined level.

5. The light bulb of claim 1 wherein the RMS magnitude of the output voltage is under half that of the power line voltage.

6. The light bulb of claim 1 wherein: (i) the translucent envelope is removable, thereby to provide manual access to the incandescent lamp means, and (ii) the incandescent lamp means is disconnectable from the output terminals, thereby to permit its removal and replacement.

7. The light bulb of claim 6 and means operative to prevent the translucent envelope from being removable as long as the temperature within the envelope exceeds a predetermined level.

8. The light bulb of claim 1 wherein the translucent envelope has openings, thereby to provide for ventilation of the space inside of the envelope.

9. The light bulb of claim 1 and means operative to permit manual adjustment of the RMS magnitude of the output voltage, thereby to permit adjustment of the Lumen output from the incandescent lamp means.

10. The light bulb of claim 1 and means operative to cause current drawn by the light bulb from the power line to be drawn at a power factor higher than 75%.

11. An improved incandescent light bulb comprising:
  screw-base means having a pair of base terminals and being operative to screw into an ordinary Edison-type lamp socket having a socket voltage, thereby to provide the socket voltage across the base terminals;
  voltage conversion means connected with the base terminals and operative to provide an output voltage at a pair of output terminals, the RMS magnitude of this output voltage being being prevented from exceeding a level that is substantially lower than that of the socket voltage;
  incandescent lamp means operative to disconnectably connect with the output terminals, thereby to be properly powered by the output voltage provided thereat; and
  translucent envelope means operative to be removably fastened onto the screw-base, thereby to enclose the voltage conversion means and the incandescent lamp means;
  thereby to provide an improved incandescent light bulb having size, shape, light output, and durability equivalent to that of an ordinary household incandescent light bulb, yet drawing less power from the lamp socket.

12. The light bulb of claim 11 wherein the incandescent lamp means is a Tungsten-Halogen lamp.

13. The light bulb of claim 11 and means operative to prevent the translucent envelope means from being removed from the screw-base as long as the temperature within the envelope means exceeds a predetermined level.

14. The light bulb of claim 11 wherein the output voltage is of frequency substantially higher than that of the voltage normally present on an ordinary electric utility power line.

15. The light bulb of claim 11 and means operative to cause current drawn by the light bulb in response to the socket voltage to be drawn with a power factor above 75%.

16. The light bulb of claim 11 having adjustment means operative to permit adjustment of the RMS magnitude of the output voltage.

17. The light bulb of claim 11 wherein the translucent envelope means comprises openings operative to permit circulation of air between the space inside of the envelope means and the space outside thereof.

18. The light bulb of claim 11 and socket means supported by the screw-base means, connected with the output voltage, and operative to receive and releasably hold the incandescent lamp means, thereby permitting the lamp means to be replaced.

19. An arrangement comprising:
  screw-base means having a pair of base terminals and being operative to screw into an ordinary Edison-type lamp socket having a socket voltage, thereby to provide the socket voltage across the base terminals;
  voltage conditioning means connected with the base terminals and operative to provide an output voltage at a pair of output terminals, the output terminals being electrically isolated from the base terminals, the voltage conditioning means comprising frequency conversion means, the output voltage being of a frequency substantially higher than that of the socket voltage;
  incandescent lamp means operative to disconnectably connect with the output terminals, thereby to be powered by the output voltage provided thereat; and translucent envelope means operative to be removably fastened onto the screw-base, thereby to enclose the incandescent lamps means when so fastened.

20. An improved incandescent light bulb comprising:

screw-base means having a pair of base terminals and being operative to screw into an ordinary Edison-type lamp socket having a socket voltage, thereby to provide the socket voltage across the base terminals;

voltage and frequency conversion means connected with the base terminals and operative to provide an output voltage at a pair of output terminals, the RMS magnitude of this output voltage being lower than half that of the socket voltage, the frequency of this output voltage being substantially higher than that of the socket voltage; and incandescent filament means operative to connect with the output terminals, thereby to be properly powered by the output voltage provided thereat;

thereby to provide an improved incandescent light bulb capable of being comprised within the shape and size of an ordinary household incandescent light bulb, yet exhibiting substantially improved luminous efficacy.

* * * * *